Figure 1:
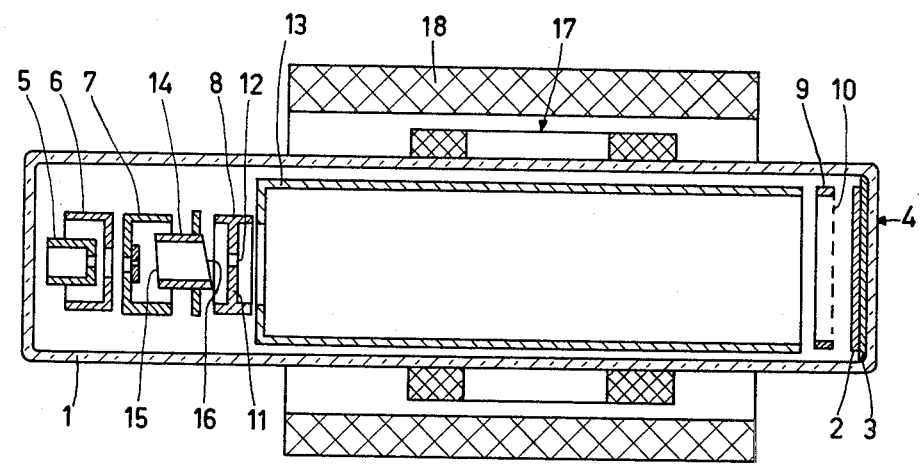

United States Patent [19]

Himmelbauer et al.

[11] 4,271,373

[45] Jun. 2, 1981

[54] CATHODE RAY TUBE WITH INCLINED ELECTROSTATIC FIELD LENS

[75] Inventors: Erich E. Himmelbauer; Joseph M. Koemans, both of Eindhoven, Netherlands

[73] Assignee: U.S. Philips Corporation, New York, N.Y.

[21] Appl. No.: 32,432

[22] Filed: Apr. 23, 1979

[30] Foreign Application Priority Data

Apr. 27, 1978 [NL] Netherlands ............... 7804518

[51] Int. Cl.³ .................. H01J 29/62; H01J 31/38
[52] U.S. Cl. ........................... 313/432; 313/389; 313/449
[58] Field of Search ............... 313/445, 424, 426, 434, 313/449, 432, 439, 389, 390, 384, 394, 448

[56] References Cited

U.S. PATENT DOCUMENTS

| 2,460,609 | 2/1949 | Torsch .................. 313/426 X |
| 2,627,043 | 1/1953 | O'Callaghan ............ 313/449 |
| 2,884,551 | 4/1959 | Raczynski .............. 313/445 |
| 3,548,250 | 12/1970 | Van Roosmalen et al. ... 313/448 X |
| 3,928,784 | 12/1975 | Weijland .............. 313/389 |

FOREIGN PATENT DOCUMENTS 570213  6/1945  United Kingdom ............ 313/432

Primary Examiner—Palmer C. Demeo

[57] ABSTRACT

A cathode ray tube comprising an extra electrode with which the electron beam can be concentrated on a diaphragm aperture and simultaneously a small predeflection of the electron beam is obtained. The extra electrode is, for example, tubular and has oblique cut ends and is situated between two other electrodes. If the extra electrode has the same potential as the two other electrodes it is inoperative. If a suitable negative voltage pulse is supplied to the extra electrode the electron beam is slightly deflected and also concentrated on the diaphragm aperture.

6 Claims, 4 Drawing Figures

CATHODE RAY TUBE WITH INCLINED ELECTROSTATIC FIELD LENS

The invention relates to a cathode ray tube comprising, centered along an axis, an electron gun for generating an electron beam directed onto a target, a diaphragm between the electron gun and the target with an aperture for limiting the electron beam, and means for concentrating at intervals the electron beam on the aperture in the diaphragm and for simultaneously producing a small predeflection of the electron beam.

Such a cathode ray tube is disclosed in U.S. Pat. No. 3,883,773, in which a device is described having a television camera tube of the vidicon type.

Such a device comprises a target and an electron gun for producing an electron beam directed onto the target. The electron gun comprises a cathode, a control grid and an acceleration anode. A diaphragm for limiting the electron beam is present between the control grid and the target. Such a tube furthermore comprises a focusing lens to focus the electron beam on the target and deflection means for periodically scanning the target by the electron beam. The tube furthermore comprises a lens electrode to concentrate periodically the electron beam on the aperture in the said diaphragm in which a small predeflection of the electron beam is also produced by means of an extra electrode.

The cathode ray tube described in the aforementioned U.S. patent is a so-called "Plumbicon". This is a vidicon, the target of which consists of a photoconductive layer of mainly lead monoxide which is provided on a transparent signal plate. The free surface of the photoconductive layer faces the electron gun.

The operation of a plumbicon is as follows. The signal plate is connected to a voltage source via a signal resistor. The potential of the signal plate is positive with respect to the cathode potential which is termed zero volts. The scene to be picked up is projected on the photoconductive layer through the signal layer. Under the influence of the positive potential of the signal plate the potential of the elementary regions of the free surface of the target increases as a result of the photoconductivity. As a result of this a potential image is formed on the free surface of the target, the potential of the elementary regions being dependent on the incident light intensity. The potential image on the target is scanned by an electron beam, usually according to a frame of substantially parallel lines. By the scanning electron beam the potential of the surface elements of the target is periodically reduced to the potential of the cathode, an output signal which is proportional to the original potential fluctuations appearing across the signal resistor.

The characteristic of the photo current of the photoconductive layer as a function of the incident light flux has a substantially linear variation. The advantage of this is that at normal light intensity output signals are obtained which depend linearly on the illumination intensity. However, the electron beam is not capable of supplying sufficient electrons to stabilize to the cathode potential those places on the target which are hit by an excessive light intensity. The unstabilized regions give rise to particularly annoying effects, for example, comet tail effects, which occur in the case of moving glaring lights. In order to prevent this effect, according to the aforementioned U.S. patent an auxiliary stabilisation takes place during the line flybacks of regions hit by excessive light intensity which during the line scans cannot be stabilized by the then available comparatively small number of electrons. With this auxiliary stabilization the potential of the cathode is increased so that the auxiliary stabilization is only effective for places hit by excessive light intensity. The picture information of regions not hit by excessive light intensity is not erased during the line flybacks by the auxiliary stabilization. During the scanning of the target during the line scans the electron beam is limited for the greater part by the diaphragm so that only a central part of the electron beam can reach the target. This is necessary to obtain at the area of the target a beam of a small diameter. However for the auxiliary stabilization a comparatively large number of electrons are necessary. For this purpose, during the flybacks the beam cross-over is displayed by means of a lens electrode on the aperture in the said diaphragm so that substantially the whole beam passes through the diaphragm. Because during the line flyback the centers of the scanning and fly-back beam are substantially superimposed, in fact only half of the beam current is effectively operative for the auxiliary stabilization. In order to cause the beam to be active more effectively on behalf of the auxiliary stabilization, according to the U.S. patent the electron beam during the line flyback period after passing through the diaphragm is deflected in the direction of the picture scanning by means of an additional deflection means. The extra deflection means is formed by a deflection plate situated inside a second cylindrical anode. During the line flyback period voltage pulses are applied to the deflection plate so as to produce this deflection.

The provision of an extra deflection means after the diaphragm makes the construction of the cathode ray tube more complicated, also because extra means have to be provided to supply voltage pulses during the line flyback period to the extra deflection element so as to produce the extra deflection.

It is the object of the invention to provide a cathode ray tube of a simple construction with which it is possible to concentrate periodically the electron beam on the diaphragm and to simultaneously produce a small predeflection of the electron beam.

According to the invention a cathode ray tube of the kind mentioned in the first paragraph is characterized in that said means comprise three tubular electrodes the facing ends of which are shaped so that at a potential difference between the first and the second electrode and a potential difference between the second and the third electrode an inclined lens field is formed between the first and the second electrode which deflects the electron beam away from the axis, and an inclined lens field is formed between the second and the third electrode which deflects the electron beam in the opposite direction towards the axis in such manner that the electron beam intersects the axis at the area of the aperture in the diaphragm and that the lens formed by the first, second and third electrodes concentrates the beam on the aperture in the diaphragm.

A first embodiment of a cathode ray tube embodying the invention is characterized in that the second electrode has ends which are oblique with respect to the axis and that the first and third electrodes have ends which are at right angles with respect to the axes.

In such a cathode ray tube the first and third electrodes are preferably connected electrically conductively and the angle at the end of the said second electrode facing the target is larger than the angle of the end remote from the target.

According to another embodiment of the cathode ray tube embodying the invention the second electrode has ends which are at right angles with respect to the axis and the ends of the first and of the third electrodes facing the second electrode are oblique with respect to the axis.

In such an embodiment the first and third electrodes are preferably connected electrically conductively and the angle of said end of the third electrode is larger than the angle of said end of the first electrode.

A cathode ray tube embodying the invention is particularly suitable for use in a device having means to supply during the line flybacks a voltage pulse of positive polarity to the cathode and to simultaneously supply a voltage pulse of negative polarity to the said second electrode.

Figures 2, 4:
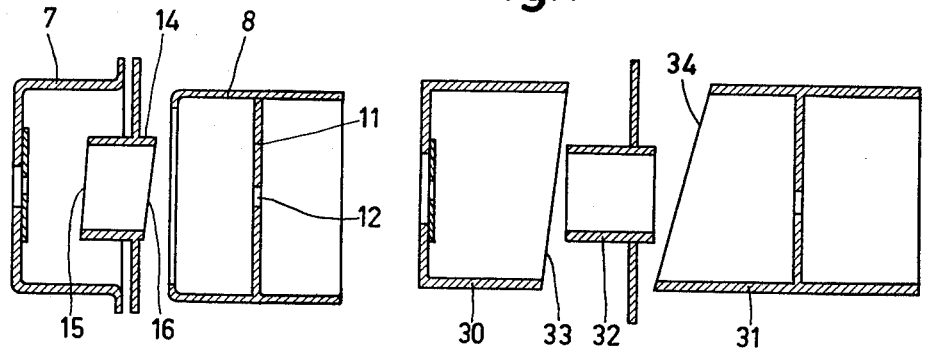
Figure 3:
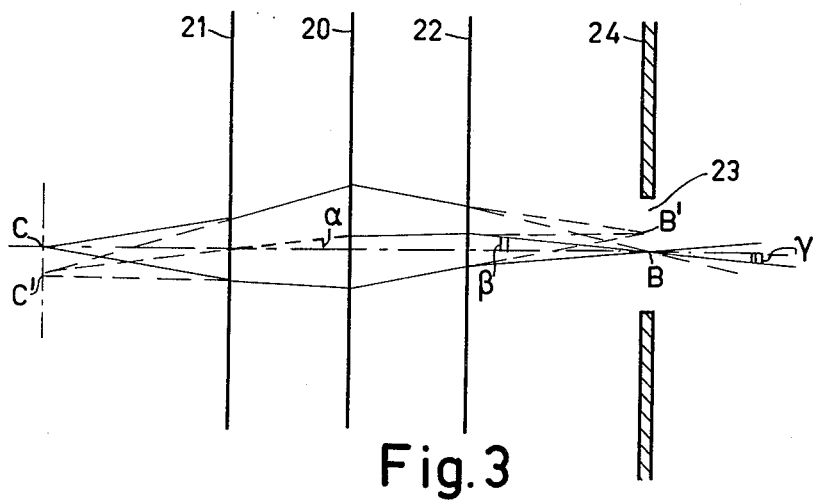

The invention will be described in greater detail with reference to the accompanying drawing, of which:

FIG. 1 is a longitudinal sectional view of a cathode ray tube according to the invention, FIG. 2 shows the electrode system of the tube shown in FIG. 1, FIG. 3 explains the operation of the system of electrodes of FIG. 2, FIG. 4 shows another embodiment of an electrode system in accordance with the invention.

The cathode ray tube shown in FIG. 1 has an evacuated cylindrical envelope 1 of glass. The tube comprises a target 2 which substantially consists of a layer of lead monoxide vapor-deposited on a signal plate 3. The signal plate 3 consists of a very thin layer of readily conducting transparent tin oxide provided on the inside of the window 4 formed by one end of the envelope. Near the other end of the envelope is situated the rotationally symmetrical electron gun which is centered along the axis of the envelope 1 and consists of a cathode 5, a control grid 6 and a cylindrical acceleration anode 7. Present between the acceleration anode 7 and the target 2 are a second acceleration anode 8, a cylindrical electrode 13 and an electrically conductive mesh 10 provided on a cylindrical electrode 9. A diaphragm 11 with aperture 12 which is electrically conductively connected to the cylindrical anode 7 is present within the second cylindrical anode 8. A tubular electrode 14 which has two oblique ends 15 and 16 is present between the cylindrical anodes 7 and 8. The acute angle which the oblique end 16 makes with the longitudinal axis of the tube is smaller than the acute angle which the oblique end 15 makes with the axis of the tube. The connection means of the electrodes and the various supply leads to the electrodes are not shown in the Figure for the sake of clarity. The tube 1 is surrounded by a focusing coil 18 for focusing the electron beam on the target 2. The tube is furthermore surrounded partly by horizontal deflection coils and vertical deflection coils, collectively denoted by 17. In addition to focusing the electron beam by means of a magnetic field, it is also possible by means of an electrical field to focus the electron beam on the target 2. For this purpose, a cylindrical focusing electrode which in cooperation with the electrode 13 constitutes a focusing lens is situated within the cylindrical electrode 13.

During horizontal scanning of the target the electrodes convey approximately the following direct voltages with respect to the cathode potential which is termed 0 volts:

the control grid (6): between −100 V and 0 V
the first anode (7): 300 V
the second anode (8): 300 V
the electrode (13): 475 V
the electrodes (9) and (10): 750 V
the signal electrode (3): 45 V
electrode (14): 300 V The above-given voltages are dependent on the dimensions and the construction of the electrodes in question. The signal plate 3 is connected, via a signal resistor (not shown), to the positive terminal of a voltage source (not shown) whose other terminal is connected to ground.

The scene to be recorded is projected on the target 2 of the tube by means of an optical system through the window 4 and the signal plate 3. The free surface of the target 2 is raster scanned by the electron beam produced by the electron gun. The potential of the elementary regions on the target 2 is stabilized to substantially the potential of the cathode 5, electric signals being formed which are derived from the said signal resistor via a capacitor (not shown). During the line scans the electron beam is intercepted for the greater part by the diaphragm 11. Only the central portion of the electron beam which passes through the aperture 12 of the diaphragm 11 is used for scanning the surface of the target 2.

During the line scans the potential of electrode 14 is substantially the same as the potential of the electrically conductively connected acceleration electrodes 7 and 8; namely approximately 300 V. Thus, during the line scans no electron-optical action occurs between the said electrodes so that the electron beam passes through the electrode 14 during the line scans without hindrance.

During the line horizontal flyback period the potential of electrode 14 is reduced to a value between 8 and 14 volts, dependent on the tolerances in the dimensions and the positioning of the electrode 14. As a result of this an inclined lens field is formed between the first acceleration anode 7 at 300 V and the oblique end 15 of electrode 14 remote from the target, and an inclined lens field is formed between the oblique end 16 of the electrode 14 facing the target 2 and the second acceleration anode 8 at 300 V. The electron beam is deflected away from the axis by the first inclined lens field and is deflected in the opposite direction towards the axis by the second inclined lens field. As a result of the lens action of electrodes 7, 14 and 8, the electron beam is also concentrated on the aperture 12 in the diaphragm 11. Since the angle of the end of electrode 14 is larger than the angle of the end 15 of electrode 14, the electron beam during the line flybacks is incident on the aperture 12 of the diaphragm 11 at a certain angle. Simultaneously with the decrease of the potential of electrode 14 to a value between 8 V and 14 V, the potential of the cathode 5 is increased to approximately 4 V–6 V.

As a result of the concentration of the electron beam on the aperture 12 in the diaphragm 11, a large beam current is available during the horizontal flyback period for auxiliary stabilization of the areas on the target 2 hit by excessive light intensity. Moreover, the electron beam is vertically deflected by the two inclined lens fields so that during the line horizontal flyback period the returning beam impinges on the target 2 just below the scanning beam. By increasing the potential of the cathode 5 during the line flybacks to, for example, 5 V, stabilization of the areas on the target 2 to 5 V takes place only so that the auxiliary stabilization has no effect on the areas which are not hit by excessive light intensity and which have a potential between 0 and 5 volts.

FIG. 2 shows the electrodes 7, 14 and 8 of FIG. 1 separately for clarity.

The dimensions of electrode 14 depend on the potentials and mutual positioning of the electrodes 7 and 8. At the above-mentioned potentials of the electrodes and a distance from the aperture in electrode 7 to the diaphragm aperture 12 in electrode 8 of 11.5 mm, the electrode 14 may comprise, for example, a metal cylinder having an inside diameter of 3.9 mm and a wall thickness of 0.5 mm. The smallest and largest length of the cylinder are 3.6 mm and 4 mm, respectively. The acute angles which the ends of the cylinder enclose with the longitudinal axis of the tube are 70° and 80°, respectively. The cylinder is soldered in a metal ring, the end face 16 serving as a reference. The distance from the surface of the ring facing electrode 8 to the aperture in electrode 8 is 6.5 mm. The above-mentioned dimensions are only one example of the many configurations of electrodes which are possible within the scope of the invention.

The operation of the electrodes 7, 14 and 8 of FIG. 1 will be described in detail with reference to FIG. 3. The electron lens formed by the first acceleration anode 7, electrode 14 and second acceleration anode 8 may be represented diagrammatically by a main lens 20. The operation of the two inclined lens fields may be represented by two prisms 21 and 22 on either side of the main lens 20.

The electron beam is deflected by the prism 21 over an angle $\alpha$. The electron beam seems to originate from a virtual cross-over c' which is moved in the radial direction with respect to the actual cross-over c. This virtual cross-over c' is reproduced by the main lens 20 on the aperture 23 in the diaphragm plane 24 and this reproduction B' is also moved in the radial direction. The electron beam is deflected in the opposite direction by the second prism 22 over an angle $\beta$. Since the angle of electrode 14 on the side of the second acceleration anode 8 is larger than on the side of the first acceleration anode 7, hence prism 22 is also stronger than prism 21, the electron beam is incident on the aperture 23 in the diaphragm plane 24 at a certain angle $\gamma$ which is substantially equal to the difference of the deflection angles $\alpha$ and $\beta$. The choice of the angle of the ends of the electrode 14 is made so that the electron beam is centered with respect to the diaphragm in order that substantially the whole beam passes through the aperture in the diaphragm and is available for auxiliary stabilization of areas on the target hit by excessive light intensity.

The positioning of electrode 14 must be such that the electron beam during the horizontal flyback period obtains a small predeflection in the vertical direction.

In magnetic focusing of the electron beam, frame rotation caused by the focusing coil should be taken into account in positioning electrode 14.

The direction of the deflection of the electron beam by the electrodes of FIG. 2 corresponding to the direction of the deflection of the central ray of the beam in FIG. 3.

In addition to the preferred embodiment shown in FIG. 2 of a system of electrodes of a cathode ray tube in which a tubular electrode having ends with different angles is positioned between two electrodes having ends at right angles at equal potentials, many embodiments of a system of electrodes of a cathode ray tube embodying the invention are possible.

For example, the two electrically isolated acceleration anodes may be at different potentials. At given potentials of the two acceleration anodes the angle of the ends of the tubular electrode are chosen to be so that during the horizontal flyback period the electron beam is centered with respect to the diaphragm and is incident on the diaphragm at a small angle.

FIG. 4 shows another embodiment of an electrode system of a cathode ray tube embodying the invention. In this embodiment a tubular electrode 32 has ends at right angles with respect to the axis of the cathode ray tube. The two acceleration anodes 30 and 31 are electrically conductively connected, which is not shown in the Figure. In order that the electron beam be incident on the diaphragm at a small angle during the horizontal flyback period, the angle of the end 34 of the anode 31 must be larger than the angle of the end 33 of anode 30.

The two acceleration anodes of the embodiment shown in FIG. 4 may also be electrically isolated and be at different potentials. At given potentials of the two acceleration anodes the angles of the two ends are determined again by the requirement that during the horizontal flyback period the electron beam should be centered and concentrated on the diaphragm and be incident on the diaphragm at a small angle.

Still other embodiments embodying the invention are obtained in that the tubular electrode has one end at right angles and one oblique end with respect to the axis of the cathode ray tube, an acceleration anode having an oblique end being positioned on the side of the end which is at right angles and an acceleration anode having an end at right angles being positioned on the side of the oblique end.

It has proved possible with cathode ray tubes embodying the invention to stabilize during the horizontal flyback period areas on the target which are hit by a light intensity which is 32 times as large as the light intensity which can at most be stabilized by the scanning beams.

What is claimed is:

1. A cathode ray tube, comprising a tubular envelope, a target on one end of the envelope, cathode means on the other end of the envelope for emitting an electron beam, a group of three tubular electrodes arranged in series between the cathode and the target, each of the electrodes having end faces, at least two of the end faces being so shaped that potential differences between the first and second electrodes and between the second and third electrodes form an inclined, electrostatic lens field between the first and second electrodes that deflects the electron beam away from the tube axis and forms an inclined, electrostatic lens field between the second and third electrodes that deflects the electron beam in the opposite direction toward the axis, a diaphragm in said third electrode, said diaphragm being provided with an aperture therethrough, the geometry of the electrodes being such that in the absence of said potential differences therebetween most of the electron beam from said cathode is intercepted by said diaphragm with a minor portion of the beam passing through the aperture, and in the presence of said potential differences most of the electron beam is concentrated in the aperture and passes therethrough at an angle to the tube axis.

2. A cathode ray tube as claimed in claim 1, wherein the end faces of said second electrode are oblique with respect to the axis and wherein said first and third electrodes have end faces which are at right angles with respect to the axis.

3. A cathode ray tube as claimed in claim 2, wherein the first and the third electrodes are electrically conductively connected and wherein the angle of the end facing the target is larger than the angle of the end of said second electrode remote from the target.

4. A cathode ray tube as claimed in claim 7, wherein the end faces of said second electrode are at right angles with respect to the axis and wherein the end faces of the first and third electrodes facing the second electrode are oblique with respect to the axis.

5. A cathode ray tube as claimed in claim 4, wherein the first and third electrodes are electrically conductively connected and wherein the angle of said end face of the third electrode is larger than the angle of said end face of the first electrode.

6. A device comprising a cathode ray tube as claimed in any one of claim 2-5 or 1, further comprising means to supply during the line flybacks a voltage pulse of positive polarity to the cathode and to simultaneously supply a voltage pulse of negative polarity to the said second electrode.

* * * * *